(12) United States Patent
Hatakeyama

(10) Patent No.: US 10,901,120 B2
(45) Date of Patent: Jan. 26, 2021

(54) TRANSPARENT ANTIREFLECTIVE LAMINATION FILM, METHOD OF FORMING ANTIREFLECTIVE LAMINATION FILM, AND EYEGLASS TYPE DISPLAY

(71) Applicant: SHIN-ETSU CHEMICAL CO., LTD., Tokyo (JP)

(72) Inventor: Jun Hatakeyama, Joetsu (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 54 days.

(21) Appl. No.: 16/196,523

(22) Filed: Nov. 20, 2018

(65) Prior Publication Data

US 2019/0170906 A1    Jun. 6, 2019

(30) Foreign Application Priority Data

Dec. 5, 2017    (JP) ................................. 2017-233779

(51) Int. Cl.
*G02B 27/00* (2006.01)
*G02B 1/111* (2015.01)
*G02B 1/118* (2015.01)

(52) U.S. Cl.
CPC .............. *G02B 1/111* (2013.01); *G02B 1/118* (2013.01)

(58) Field of Classification Search
CPC ........... G02B 1/00; G02B 1/04; G02B 1/041; G02B 1/10; G02B 1/11; G02B 1/111;
(Continued)

(56) References Cited

U.S. PATENT DOCUMENTS 6,054,991 A    4/2000 Crane et al.
9,128,220 B2 *  9/2015 Ochi .................... G02B 6/0033
(Continued)

FOREIGN PATENT DOCUMENTS

JP    H05-204157 A    8/1993
JP    H05-215908 A    8/1993
(Continued)

OTHER PUBLICATIONS

Dec. 17, 2019 Office Action issued in Korean Patent Application No. 10-2018-0154430.

(Continued)

*Primary Examiner* — Arnel C Lavarias
(74) *Attorney, Agent, or Firm* — Oliff PLC

(57) ABSTRACT

A transparent antireflective lamination film including: a first film composed of a first material having a first refractive index; a second film having a refractive index lower than the first film laminated on the first film, including a pattern composed of a second material having a second refractive index lower than the first refractive index formed in a film composed of the first material; and at least one layer of film laminated on the second film, at least one layer of film including: a film including the pattern composed of the second material having larger area than in the second film, and/or a film including a pattern composed of a material having a refractive index lower than the second refractive index, wherein the refractive index of each film is decreasing toward the upper side from the first film in the antireflective lamination film.

16 Claims, 4 Drawing Sheets

(58) Field of Classification Search
CPC .......... G02B 1/113; G02B 1/118; G02B 5/28; G02B 5/285; G02B 5/286; G02B 5/287; G02B 27/01; G02B 27/0101; G02B 2027/0118; G02B 27/017; G02B 27/0172
USPC ....... 359/577, 580, 581, 582, 586, 588, 589, 359/590, 601, 609
See application file for complete search history.

(56) References Cited

U.S. PATENT DOCUMENTS

| | | | |
|---|---|---|---|
| 2001/0010890 A1 | 8/2001 | Hatakeyama et al. | |
| 2001/0018162 A1 | 8/2001 | Hatakeyama et al. | |
| 2003/0082479 A1 | 5/2003 | Hatakeyama et al. | |
| 2004/0191478 A1 | 9/2004 | Nishikawa et al. | |
| 2007/0072115 A1 | 3/2007 | Hatakeyama et al. | |
| 2007/0122740 A1 | 5/2007 | Hatakeyama et al. | |
| 2008/0227037 A1 | 9/2008 | Hatakeyama et al. | |
| 2010/0227273 A1 | 9/2010 | Hatakeyama et al. | |
| 2010/0227274 A1 | 9/2010 | Hatakeyama et al. | |
| 2011/0051250 A1* | 3/2011 | Fujita | G02B 5/0247 359/601 |
| 2013/0021392 A1 | 1/2013 | Travis | |
| 2014/0133031 A1* | 5/2014 | Coffey | G02B 1/118 359/601 |
| 2014/0170563 A1 | 6/2014 | Hatakeyama | |
| 2015/0144918 A1 | 5/2015 | Cho et al. | |
| 2016/0178806 A1* | 6/2016 | Takei | C03C 8/16 359/507 |
| 2017/0199457 A1 | 7/2017 | Hatakeyama et al. | |

FOREIGN PATENT DOCUMENTS

| | | |
|---|---|---|
| JP | H05-264802 A | 10/1993 |
| JP | H06-236432 A | 8/1994 |
| JP | 2001-233917 A | 8/2001 |
| JP | 2001-302728 A | 10/2001 |
| JP | 2002-107933 A | 4/2002 |
| JP | 2002-119659 A | 4/2002 |
| JP | 2003-089708 A | 3/2003 |
| JP | 2004-077632 A | 3/2004 |
| JP | 2005-250434 A | 9/2005 |
| JP | 2007-114728 A | 5/2007 |
| JP | 2007-171895 A | 7/2007 |
| JP | 2008-257188 A | 10/2008 |
| JP | 2010-237661 A | 10/2010 |
| JP | 2010-237662 A | 10/2010 |
| JP | 2011-138107 A | 7/2011 |
| JP | 2011-141471 A | 7/2011 |
| JP | 2011-150103 A | 8/2011 |
| JP | 2014-119659 A | 6/2014 |
| KR | 10-2004-0020947 A | 3/2004 |
| KR | 10-2015-0059494 A | 6/2015 |
| KR | 10-2017-0084691 A | 7/2017 |

OTHER PUBLICATIONS

Jun. 24, 2020 Decision for Refusal issued in Korean Application No. 10-2018-0154430.

Aug. 25, 2020 Office Action issued in Korean Application No. 10-2018-0154430.

* cited by examiner

TRANSPARENT ANTIREFLECTIVE LAMINATION FILM, METHOD OF FORMING ANTIREFLECTIVE LAMINATION FILM, AND EYEGLASS TYPE DISPLAY

TECHNICAL FIELD

The present invention relates to an antireflective lamination film, a method of producing the same, and an eyeglass type display using the antireflective lamination film.

BACKGROUND ART

The development of devices for virtual reality (VR) has been advancing. Wearing a goggles type VR, it is possible to watch a movie and to converse with a person remote from each other as if being adjacent to (PATENT LITERATURE 1). It becomes familiar to experience images as if to go beyond space-time, which were shown in SF movies in the past.

In order to obtain real feeling of virtual reality, it has been investigated to reduce the weight and the thickness of the goggles. It is also necessary to replace the pair of goggles itself to an eyeglass type (glasses type), which is lighter in weight, and it will become necessary to contrive devices that enable to experience VR without having glasses. As a technique to form images in space, holography has been known. This makes it possible to experience VR without having goggles or glasses. In the holography, images in space are formed by highly coherent laser interference. Due to the weight reduction, miniaturization, cost reduction, quality improvement, and increased intensity of laser apparatuses, holography has become familiar recently. It has been proposed a technique to let light through a propagation layer for light to the vertical direction, which is projected using holography (PATENT LITERATURE 2). This is constructed such that light is propagated to the horizontal direction to an eyeglass, and is diffracted to project images to the vertical direction, which is the direction to an eye.

In the holography, resolution and contrast of images are changed due to differences in accuracy and resolution of a pattern to be diffracted. At present, liquid crystal displays and organic EL displays are much better in resolution and contrast of images.

If a head mount display is replaced with an eyeglass type display, which is light in weight, it is possible to reduce the weight substantially. In this case, it becomes necessary to provide a technique to project oblique incident light that is extremely thin, a thin constitution of lenses to focus on an object at a short distance, and a high quality antireflective film material to project light with a small incidence angle without reflecting it.

It has long been proposed to provide a display with an antireflective film at the side of eyes (PATENT LITERATURE 3). This allows images projected from a display to be seen in a highly contrast state without losing the intensity. It has also been demonstrated that a multi-layer antireflective film is effective as the antireflective film (PATENT LITERATURE 4). To prevent reflections with respect to visible lights with various wavelength and lights at various angles, multi-layer antireflective films are favorable.

An antireflective film with a moth eye structure has been proposed (PATENT LITERATURE 5). In this film, massed pillars with higher refractive index are formed in which the pillar is finer than the wavelength, finer at the tip and thicker at the substrate side, thereby making the refractive index be lower at the tip and higher at the substrate side. The moth eye structure can realize effect that is similar to the case of multilayer antireflective film. However, this involves a problem that the antireflective function lowers when a foreign matter sticks to the pillars or the pillar breaks.

CITATION LIST

Patent Literature

PATENT LITERATURE 1: Japanese Patent Laid-Open Publication (Kokai) No. H06-236432
PATENT LITERATURE 2: US 2013/0021392A1
PATENT LITERATURE 3: Japanese Patent Laid-Open Publication (Kokai) No. H05-215908
PATENT LITERATURE 4: Japanese Patent Laid-Open Publication (Kokai) No. H05-264802
PATENT LITERATURE 5: Japanese Patent Laid-Open Publication (Kokai) No. 2004-77632

SUMMARY OF THE INVENTION

Technical Problem

The present invention was accomplished in view of the above-described problems. It is an object of the present invention to provide an antireflective lamination film that is able to give antireflection effect to decrease the reflection of light, a method of producing the same, and an eyeglass type display.

Solution to Problem

To solve the above problems, the present invention provides a transparent antireflective lamination film, comprising:

a first film composed of a first material having a first refractive index;

a second film having a refractive index lower than that of the first film laminated on the first film, wherein the second film includes:

a pattern composed of a second material having a second refractive index lower than the first refractive index formed in a film composed of the first material; and at least one layer of film laminated on the second film, the at least one layer of film including:

a film including the pattern composed of the second material having larger area than in the second film, and/or a film including a pattern composed of a material having a refractive index lower than the second refractive index, wherein the refractive index of each film is successively decreasing toward the upper side from the first film in the antireflective lamination film.

The inventive antireflective lamination film is able to give antireflection effect to decrease the reflection of light.

It is preferable that the pattern have a pattern size of 200 nm or less.

The antireflective lamination film, with the pattern having such a pattern size, is preferable since Mie-scattering can be prevented therein.

It is preferable that the refractive index of the first film be 1.65 or more, and the refractive index of the film that has the lowest refractive index be 1.35 or less with respect to visible light having a wavelength of 590 to 610 nm.

The antireflective lamination film in which such films are laminated is able to give antireflection effect to further decrease the reflection of light.

It is preferable that the transmittance of visible light having a wavelength of 400 nm to 800 nm be 80% or more.

The antireflective lamination film with such transmittance can be preferably used as a light-weight and thin eyeglass-type head mount display by which light with higher brightness and higher contrast can be seen.

It is preferable that at least one of the first material and the second material be a photoresist material.

It is also preferable that at least one of the first material and the second material be a non-photosensitive material.

With such first material and/or second material, it becomes more easy to form a pattern(s) in the antireflective lamination film.

The present invention also provides a method of forming the antireflective lamination film described above, wherein the pattern is formed by photolithography.

The Pattern is preferably formed by photolithography and etching.

The present invention also provides a method of forming the antireflective lamination film described above, wherein the pattern is formed by an imprint method.

The inventive antireflective lamination film can be formed by the formative method like this.

The present invention also provides an eyeglass type display, comprising:

a self-emitting display selected from the group consisting of liquid crystal, organic EL, and micro LED installed on a substrate at the side of an eyeball of the eyeglass type display, and a convex lens for focusing installed on the side of an eyeball of the self-emitting display, wherein the antireflective lamination film described above is formed on a surface of the convex lens.

The inventive eyeglass type display can be preferably used as a light-weight and thin eyeglass-type head mount display by which light with higher brightness and higher contrast can be seen.

Advantageous Effects of Invention

As described above, in the antireflective lamination film of the present invention, the multistage alteration of the refractive index can be realized from a film with a higher refractive index to a film with a lower refractive index and the rate of altering the refractive index and the number of film can be adjusted arbitrary. This makes it possible to obtain antireflective effect, which exhibits lower reflection to visible light particularly in the case of shallow incident light. Accordingly, when it is combined with a lens(es) with a high refractive index, light emitted from liquid crystal, organic EL, and micro LED that are installed near eyes can be seen in the state of higher contrast and higher brightness. The inventive method of forming an antireflective lamination film makes it possible to form the inventive antireflective lamination film easily. Moreover, an eyeglass type display using the inventive antireflective lamination film can realize an eyeglass type display which is substantially light in weight and thin compared to previous head mount displays.

DESCRIPTION OF EMBODIMENTS

Figure 1:
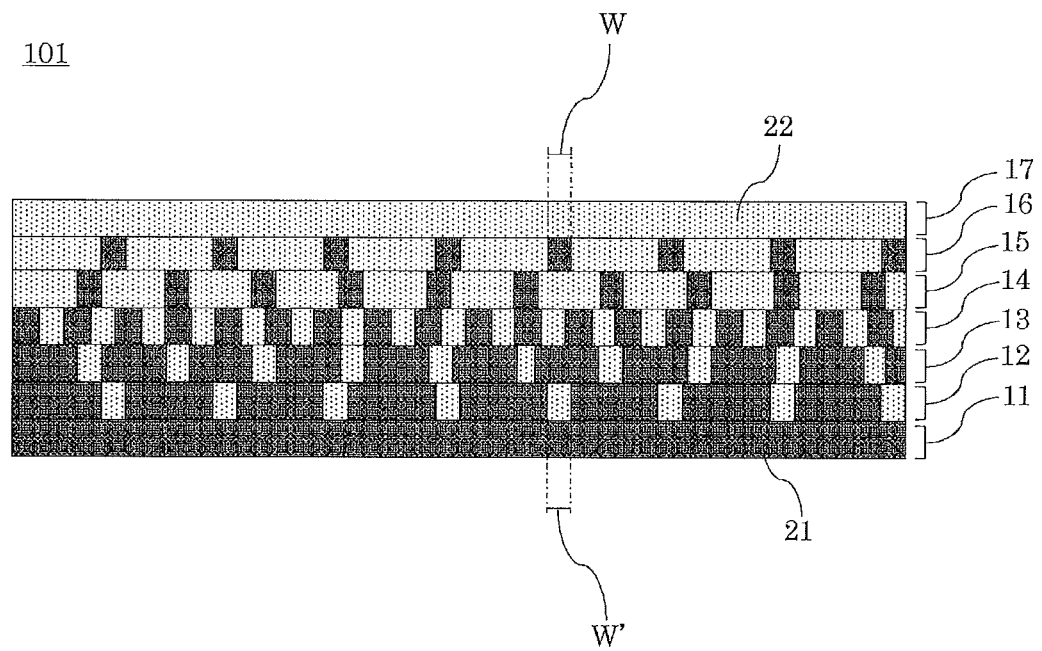
FIG. 1 is a schematic sectional view showing an example of the inventive antireflective lamination film.

As described above, it has been known that excellent antireflective effect can be obtained by installing a film with a lower refractive index at the side of air (eyes), a film with a higher refractive index at the side of generating light, which is opposite to the eye, and a multilayer film therebetween in which the refractive index alters gradually. However, the refractive index is an intrinsic value of each material. Accordingly, to change the refractive index gradually, it is necessary to laminate films of materials with the refractive indexes being different from each other, and it has been difficult to adjust the refractive index. It is also conceivable to alter the refractive index of the film to be laminated by blending a material with a higher refractive index and a material with a lower refractive index, together with altering the ratio of blending. However, the material with a higher refractive index and the material with a lower refractive index are largely different in polarity in many cases, and are not mixed after blending thereby. Accordingly, this method is not popular either. It is also conceivable to form the moth eye pattern described above as an antireflective film. However, there is a problem that it is difficult to form a pattern with material having a high refractive index of 1.65 or more, which can be a moth eye pattern.

The present inventors diligently investigated to achieve the foregoing objects and consequently found that laminating three or more layers of films including a film in which a pattern with a higher refractive index and a pattern with a lower refractive index coexist in the same film, together with a film in which the ratio of the patterns was altered, makes it possible to form an antireflective lamination film in which the refractive index alters successively with each laminated film to give excellent antireflective effect; thereby bringing the present invention to completion.

That is, the present invention is a transparent antireflective lamination film, comprising:

a first film composed of a first material having a first refractive index;

a second film having a refractive index lower than that of the first film laminated on the first film, wherein the second film includes:

a pattern composed of a second material having a second refractive index lower than the first refractive index formed in a film composed of the first material; and at least one layer of film laminated on the second film, the at least one layer of film including:

a film including the pattern composed of the second material having larger area than in the second film, and/or a film including a pattern composed of a material having a refractive index lower than the second refractive index, wherein the refractive index of each film is successively decreasing toward the upper side from the first film in the antireflective lamination film.

Hereinafter, the present invention will be specifically described by referring to FIGS., but the present invention is not limited thereto.

<Antireflective Lamination Film>

The present invention provides a transparent antireflective lamination film, comprising:

a first film composed of a first material having a first refractive index;

a second film having a refractive index lower than that of the first film laminated on the first film, wherein the second film includes:

a pattern composed of a second material having a second refractive index lower than the first refractive index formed in a film composed of the first material; and at least one layer of film laminated on the second film, the at least one layer of film including:

a film including the pattern composed of the second material having larger area than in the second film, and/or a film including a pattern composed of a material having a refractive index lower than the second refractive index, wherein the refractive index of each film is successively decreasing toward the upper side from the first film in the antireflective lamination film.

An example of the inventive antireflective lamination film is shown in FIG. 1 as a schematic sectional view. The antireflective lamination film 101 of FIG. 1 is a lamination film in which seven layers of films of the first film 11 to the seventh film 17 are laminated. The first film 11 is a film composed of a first material 21 having a first refractive index. The second film 12 is a film in which a pattern composed of a second material 22 having a second refractive index lower than the first refractive index is formed in a film composed of the first material 21. The second film 12 has a refractive index lower than that of the first film 11 as a whole film. The third film 13 is a film in which a pattern composed of the second material 22 is formed in a film composed of the first material 21, with the proviso that the pattern density is higher (the pattern has larger area) than in the second film 12, and has a lower refractive index as a whole film than that of the second film 12. Similarly, in the fourth film 14 to the sixth film 16, the density of the pattern composed of the second material 22 increases successively, and the refractive index of each film decreases successively. The seventh film 17 is a film composed of the second material 22 only. In the present invention, this seventh film is deemed to be a film in which the pattern area of the second material (the area covered with the second material) is 100%.

In order not to cause Mie-scattering, the pattern preferably has a size smaller than the wavelength of the visible light. The size of the pattern is more preferably ½ or less relative to the wavelength. Since the shortest wavelength in the visible light is about 400 nm, the size of the pattern is preferably 200 nm or less, more preferably 100 nm or less.

The film thickness of one layer is preferably 5 nm or more and 500 nm or less, and the film thickness of all of the layers is preferably 100 nm or more and 10 μm or less. The number of layers to be laminated is 3 or more at least, preferably 4 or more, and more preferably 5 or more. Although the upper limit of the number of layer is not limited, larger number of layer does not necessarily improve the antireflective effect, and larger number of layer elongates the process for manufacturing the same to increase the cost. Accordingly, the maximum number of layer is preferably 20 or less.

In order to obtain more improved antireflective effect, the refractive index of the first film is preferably 1.65 or more, and the refractive index of the film that has the lowest refractive index is preferably 1.35 or less with respect to visible light having a wavelength of 590 to 610 nm; more preferably, the refractive index of the first film is 1.7 or more, and the refractive index of the film that has the lowest refractive index is 1.3 or less; and still more preferably, the refractive index of the first film is 1.75 or more, and the refractive index of the film that has the lowest refractive index is 1.25 or less. In the films laminated between the first film and the film that has the lowest refractive index, the refractive index gets smaller successively toward the upper side from the first film.

Regarding the pattern of the film, in order to alter the refractive index of each laminated film successively, it is preferable that the density of pattern composed of the first material be higher at the side with a higher refractive index, and the density of pattern composed of the second material be higher at the side with a lower refractive index as shown in FIG. 1. Alternatively, it is also possible to laminate a film with the refractive index being much lower in which the pattern is formed from a material that has a refractive index lower than that of the second material.

The first material is not particularly limited, and illustrative examples thereof include titanium oxide, zirconium oxide, hafnium oxide, and tin oxide. It is also possible to use a film in which nanoparticles of any of these oxides are dispersed. Illustrated examples thereof also include organic materials with higher refractive indexes such as polymer compounds and compounds containing a condensed aromatic ring, bromine, iodine, or sulfur. Titanium oxide and zirconium oxide produced by CVD or sputtering have a refractive index of 2.4 and 2.0 respectively, and the refractive index of titanium oxide produced by spin coating is 1.9 to 2.0.

As the organic compound film with a higher refractive index that can be produced by spin coating, compounds having a condensed aromatic ring can be exemplified. These are applied to a crosslinkable underlayer film material for photolithography process, and illustrative examples thereof include acenaphtylene copolymer described in JP 2005-250434A and hydroxyvinylnaphthalene copolymer described in JP 2007-171895A.

Polyacenaphtylene homopolymer has a refractive index of 1.68. Polymer compounds having a condensed aromatic group obtained by polymerization such as radical polymerization has a higher refractive index and is highly transparent. Although novolak resins have a higher refractive index, the absorption end thereof extends to visible light of the blue region. Accordingly, novolak resins have lower transparency in this wavelength region and is not suitable for the use for the present invention. The novolak resin of fluoren bis naphthol has a refractive index of 1.7, but has absorbance in the blue region. Fullerene also has a higher refractive index, but has absorbance in all regions of visible light, thereby being unfavorable.

As the second material, fluorine polymers can be exemplified, though it is not limited thereto. Teflon (trade mark) type polymer has a refractive index of 1.35 in the area of visible light. Methacrylate having a pendant fluoroalkyl group has a refractive index of about 1.42. For example, JP 2008-257188A shows a crosslinkable underlayer film with a lower refractive index having a fluoroalcohol group. As a material with a still lower refractive index, porous silica films can be exemplified. The refractive index is decreased by enlarging the size of the pores or increasing the ratio of the pores, and can be decreased to about 1.25 thereby.

When the material contained in the inventive antireflective lamination film, including the first material and the second material, is a photoresist material, the pattern can be formed by exposure and development as will be described later.

As the photoresist material with higher refractive index having a condensed aromatic ring, resist compounds having an acid labile group of condensed aromatic group are exemplified in JP 2010-237662A, JP 2010-237661A, JP 2011-150103A, JP 2011-138107A, and JP 2011-141471A. The unit with a higher refractive index is also involved in acenaphthylene described in JP 2002-119659A, vinylferrocene described in JP 2014-119659A, hydroxyvinylnaphthalene described in JP 2002-107933A, and hydroxynaphthalenemethacrylate described in JP 2007-114728A. Hydroxystyrenes substituted with bromine or iodine described in JP H5-204157A are also units with higher refractive indexes.

As the photoresist material with a lower refractive index, it is possible to exemplify resist materials containing fluorine that have been developed for $F_2$ lithography using excimer laser with the wavelength of 157 nm. These resist materials are disclosed in JP 2001-302728A, JP 2001-233917A, and JP 2003-89708A.

The material contained in the inventive antireflective lamination film, including the first material and the second material, may be a non-photosensitive material. In this case, the pattern can be formed by etching as will be described later.

The inventive antireflective lamination film, in which fine pattern is formed to realize multistage alteration of the refractive index, allows the image projected from a display of liquid crystal, organic EL, or micro LED to emit obliquely with high brightness and high contrast. It is also possible to prevent reflection of oblique incident light from the opposite side of a display not only reflection in which light emitted from the display side returns to the display side.

<Method of Forming Antireflective Lamination Film>

The present invention also provides a method of forming the antireflective lamination film described above, wherein the pattern is formed by photolithography, etching, and/or an imprint method.

Figure 2:
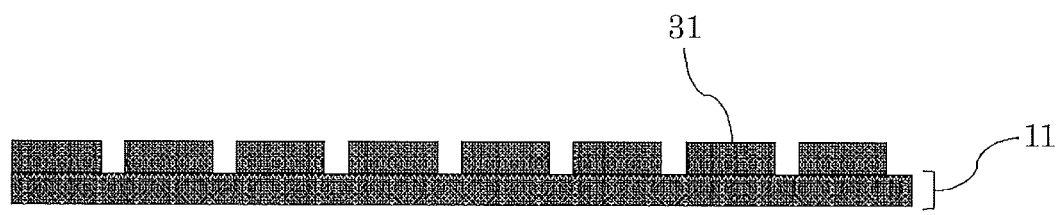
FIG. 2 is a schematic sectional view showing an example of the inventive antireflective lamination film after forming a pattern composed of the first material of the second layer.

FIG. 2 is a schematic sectional view showing an example of the inventive antireflective lamination film after forming a pattern composed of the second material of the second layer. The method of forming the second film 12 includes a method to form the pattern 31 composed of the first material on the first film 11 in advance as shown in FIG. 2. When the film composed of the first material is formed on the first film 11 by spin coating, it is necessary not to dissolve the underneath first film 11 in dispensing the solution of the first material. Accordingly, it is necessary to make the lowest first film 11 not to be dissolved in the solvent. The methods to make it insoluble to solvent include crosslinking the first film 11 by light or heat, insolubilizing by chemical treatment of the surface. The insolubilizing method by light includes a method of crosslinking by irradiating with UV light having a wavelength of 146 nm, 172 nm, or 193 nm, for example. The insolubilizing method by heat includes a crosslinking method by heating a material in which a thermal-acid generator and a crosslinking agent have been added. These method can be applied to underlayer films that will be described below.

Figure 4:
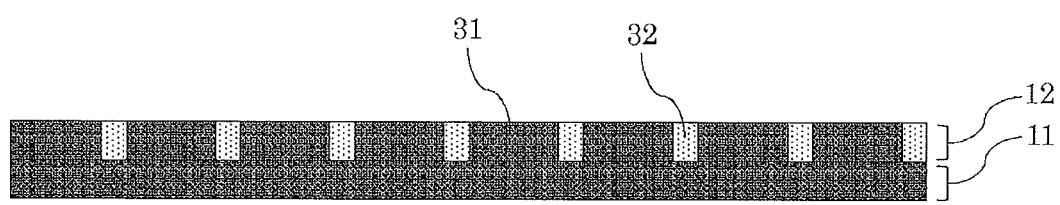
FIG. 4 is a schematic sectional view showing an example of the inventive antireflective lamination film after forming a pattern composed of the first material and a pattern composed of the second material of the second layer.
Figure 5:
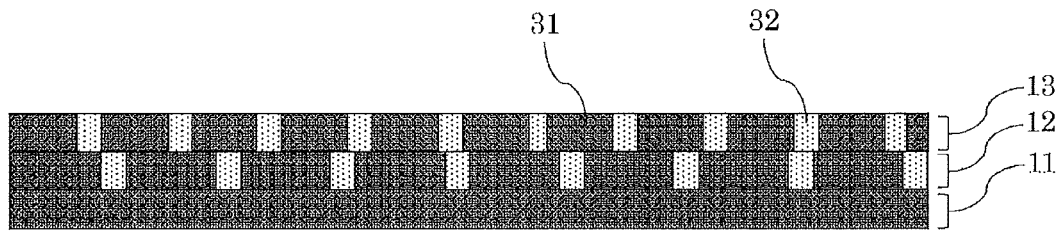
FIG. 5 is a schematic sectional view showing an example of the inventive antireflective lamination film after forming a pattern composed of the first material and a pattern composed of the second material of the third layer.
Figure 6:
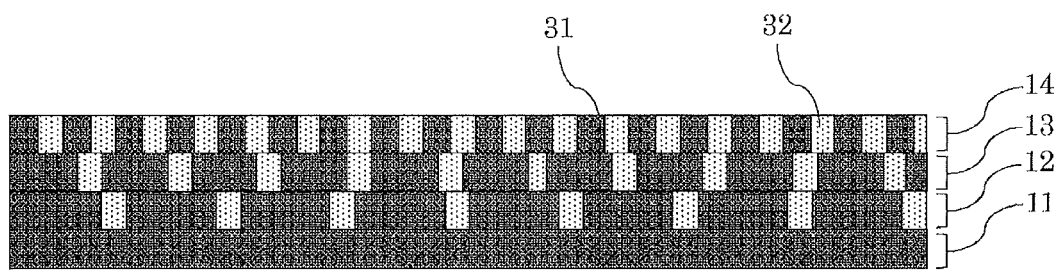
FIG. 6 is a schematic sectional view showing an example of the inventive antireflective lamination film after forming a pattern composed of the first material and a pattern composed of the second material of the fourth layer.
Figure 7:
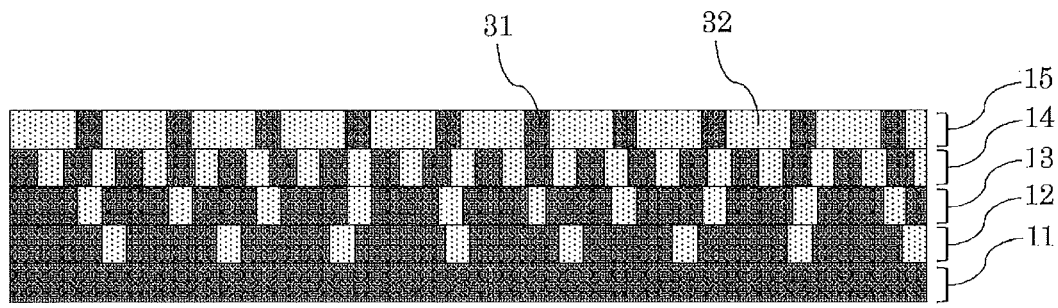
FIG. 7 is a schematic sectional view showing an example of the inventive antireflective lamination film after forming a pattern composed of the first material and a pattern composed of the second material of the fifth layer.
Figure 8:
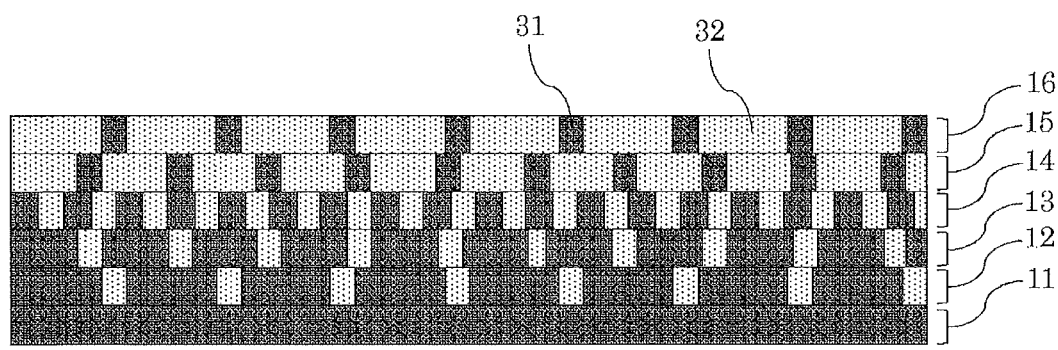
FIG. 8 is a schematic sectional view showing an example of the inventive antireflective lamination film after forming a pattern composed of the first material and a pattern composed of the second material of the sixth layer.

The formation of the pattern 31 composed of the first material can be performed by exposure and development when a photoresist material with higher refractive index is used. In using an underlayer film material with higher refractive index, the pattern 31 composed of the first material shown in FIG. 2 is formed by forming a silicon-containing middle layer on the underlayer film and a photoresist film thereon to form a tri-layer, forming a photoresist pattern by exposure and development, followed by transferring this pattern to the middle layer, and then, to the underlayer film. After forming the pattern 31 composed of the first material, the second material is buried therein as shown in FIG. 4 by spin coating.

Figure 3:
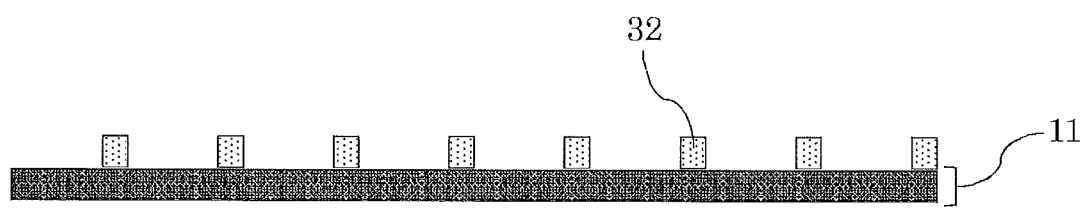
FIG. 3 is a schematic sectional view showing an example of the inventive antireflective lamination film after forming a pattern composed of the second material of the second layer.

As shown in FIG. 3, it is possible to form the pattern 32 composed of the second material on the first film 11 in advance. This can also be performed by exposure and development when a photoresist material with lower refractive index is used as in the case of forming the pattern 31 composed of the first material described above. In using an underlayer film with lower refractive index, the pattern 32 composed of the second material shown in FIG. 3 is formed by forming a silicon-containing middle layer, an organic antireflective film, or an underlayer film and a silicon-containing middle film on the underlayer film, together with a photoresist film thereon, forming a photoresist pattern by exposure and development, and finally transferring this pattern to the underlayer film. After forming the pattern 32 composed of the second material, the first material was buried therein as shown in FIG. 4 by spin coating.

To form the pattern 31 composed of the first material or the pattern 32 composed of the second material shown in FIG. 2 or FIG. 3, nano-imprint lithography can also be used. In this case, the solution is dropped and cured by irradiation with light while being pressed with a transparent stamper mask in which a pattern is formed; or cured by heat while being pressed with a stamper mask in which a pattern is formed.

It is also possible to form the pattern 31 composed of the first material or the pattern 32 composed of the second material by sputtering or chemical vapor deposition (CVD). In this case, planarization such as a spin coating method is difficult to apply, and it is preferable that planarization is performed by chemical mechanical polishing (CMP) after forming the film composed of the second material on the pattern 31 composed of the first material by CVD or sputtering, for example.

It is also possible to form a film composed of the first material or a film composed of the second material by spin coating, CVD, or sputtering, followed by forming a photoresist film thereon, forming a pattern by exposure and development, and dry etching to transfer the pattern to the film composed of the first material or the film composed of the second material.

It is also possible to form a pattern by exposure and development using a photoresist material with higher refractive index or lower refractive index described in the explanation of the antireflective laminate film. In this case, the dry etching described above is unnecessary. However, in case of forming the pattern 31 composed of the first material and applying the solution of the second material thereon, for example, it is preferable to use solvent that does not dissolve the pattern 31 composed of the first material in the solution of the second material, or to conduct a freezing process to insolubilize the pattern 31 composed of the first material to the organic solvent so as not to dissolve the pattern 31 composed of the first material into the solvent of the solution of the second material.

Illustrative examples of the solvent in which the resist pattern is insoluble include alcohol solvents, ether solvents, hydrocarbon solvents, and fluorine solvents; and the second material is preferably dissolved into these solvents. When the second material covers the upper part of the pattern, not only buries the space of the resist pattern, and is crosslinked, it is possible to prevent the resist pattern from dissolving in case of applying the photoresist solution thereon.

The third layer and the following layers can be formed in the same manner as in the method described above. FIG. 5 to FIG. 8 are schematic sectional views each showing an example after forming the third layer to the sixth layer.

Figure 9:
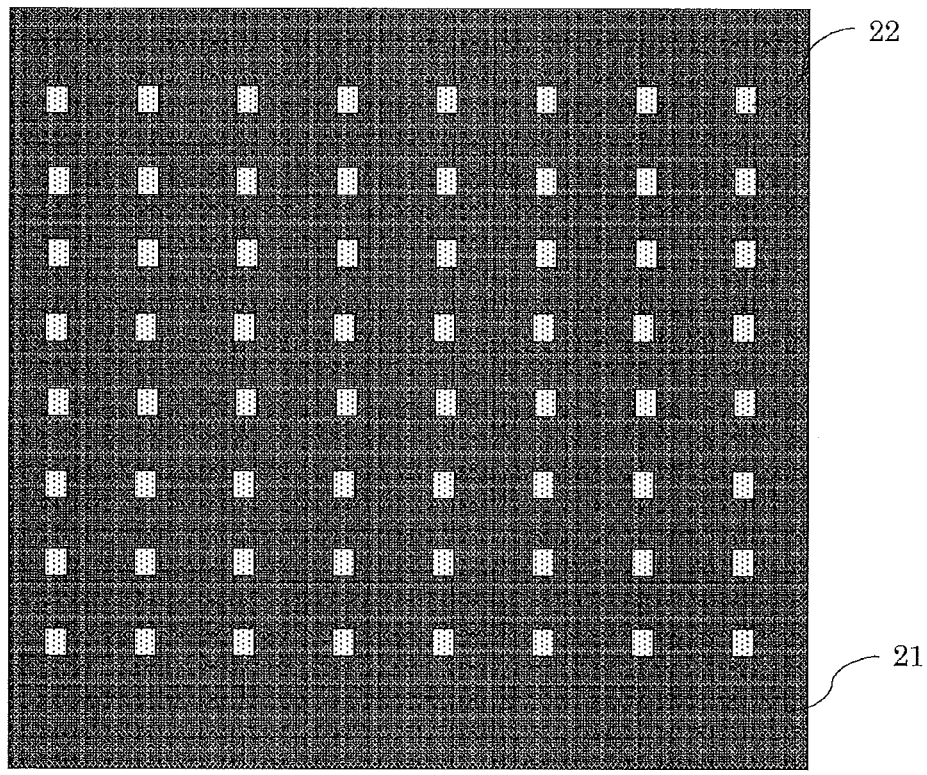
FIG. 9 is a schematic top view showing an example of the inventive antireflective lamination film after forming a pattern composed of the first material and a pattern composed of the second material.
Figure 10:
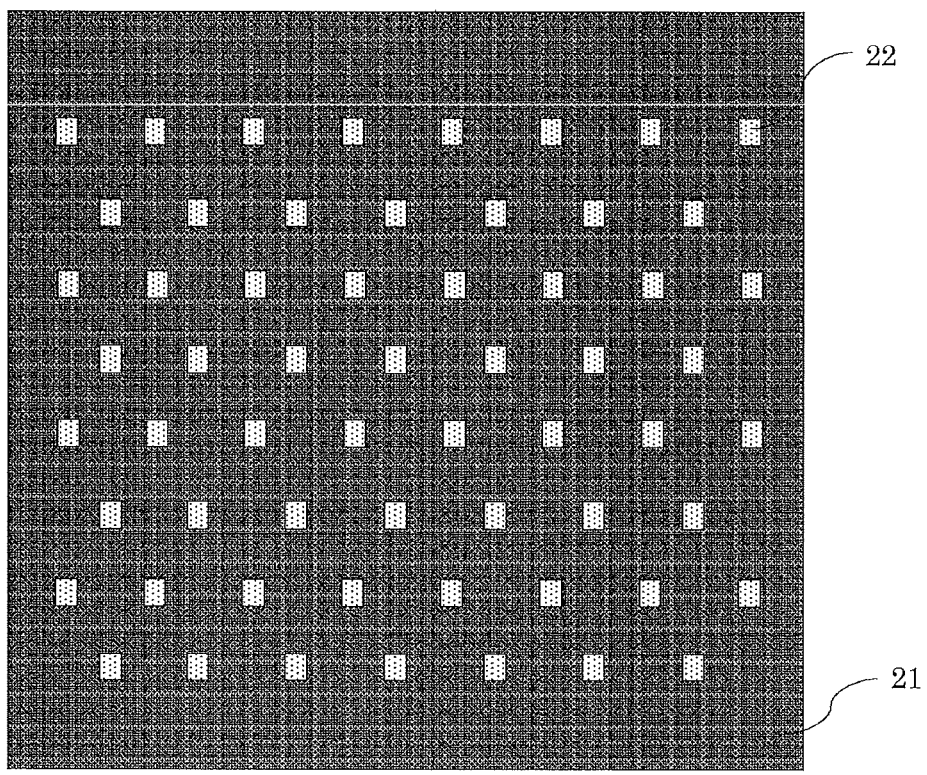
FIG. 10 is a schematic top view showing an example of the inventive antireflective lamination film after forming a pattern composed of the first material and a pattern composed of the second material.

The pattern 31 composed of the first material or the pattern 32 composed of the second material may have any layout, when it is observed from the above, of the cross-shaped arrangement shown in FIG. 9, the arrangement shown in FIG. 10, or other arrangement. However, the pattern preferably has the same pitch and the same size. When the pattern is same in each of size and pitch, the film has uniform refractive index, thereby being preferable.

The inventive method of forming the antireflective lamination film like this enables the refractive index to have multistage alteration from a film with higher refractive index to a film with lower refractive index. It is also possible to easily form an antireflective lamination film in which the rate of altering the refractive index or the number of film can be arbitrary adjusted.

<Eyeglass Type Display>

The present invention also provides an eyeglass type display, comprising:
a self-emitting display selected from the group consisting of liquid crystal, organic EL, and micro LED installed on a substrate at the side of an eyeball of the eyeglass type display, and
a convex lens for focusing installed on the side of an eyeball of the self-emitting display,
wherein the inventive antireflective lamination film is formed on a surface of the convex lens.

Figure 11:
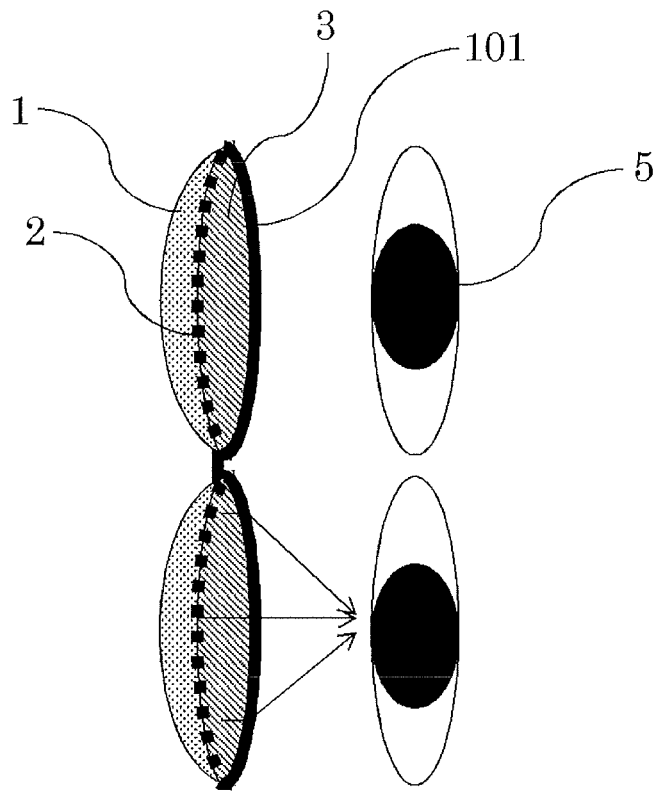
FIG. 11 is a schematic sectional view showing an example of the case of wearing the inventive eyeglass type display.

FIG. 11 is a schematic sectional view showing an example of the case of wearing the inventive eyeglass type display. The self-emitting display 2 is provided at the side of an eyeball of the eyeglass substrate 1. The self-emitting display 2 is made of any of liquid crystal, organic EL, or micro LED. The convex lens 3 is provided on the side of an eyeball of the self-emitting display 2. Each convex lens 3 is provided for focusing light emitted from the self-emitting display 2 on the eye 5. The inventive antireflective lamination film 101 is provided at the side of an eyeball of the convex lens 3. The antireflective lamination film 101 is as described above.

The inventive eyeglass type display makes it possible to realize an eyeglass type display, which is substantially light in weight and thin compared to previous head mount displays.

EXAMPLES

Hereinafter, the present invention will be explained more specifically by showing Examples and Comparative Examples, but the present invention is not limited to the following Examples.

As a first material, the following High refractive index polymer-1 of 6-hydroxyvinylnaphthalene and acenaphthylene obtained by radical polymerization was prepared.

6-hydroxyvinylnaphthalene:acenaphthylene=40:60
weight average molecular weight (Mw)=7,500
molecular weight distribution (Mw/Mn)=1.97

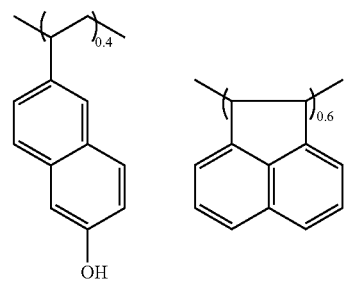

High refractive
index polymer-1

As another first material, the following High refractive index polymer-2 of homopolymer of 4-hydroxy-2,3,5,6-tetrabromobenzene methacrylate-2-yl obtained by radical polymerization was prepared.

4-hydroxy-2,3,5,6-tetrabromobenzene methacrylate-2-yl=100
weight average molecular weight (Mw)=8,600
molecular weight distribution (Mw/Mn)=1.74

High refractive
index polymer-2

As another first material, the following High refractive index polymer-3 of homopolymer of 4-hydroxy-3,5-diiodostyrene obtained by radical polymerization was prepared.

4-hydroxy-3,5-diiodostyrene=100
weight average molecular weight (Mw)=6,300
molecular weight distribution (Mw/Mn)=1.66

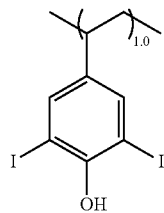

High refractive
index polymer-3

As a second material, the following Low refractive index polymer-1 of 2-hydroxy-3,3,3-trifluoro-2-(trifluoromethyl)propyl acrylate and glycidyl methacrylate obtained by radical polymerization was prepared.

2-hydroxy-3,3,3-trifluoro-2-(trifluoromethyl)propyl acrylate:glycidyl methacrylate=80:20
weight average molecular weight (Mw)=8,100
molecular weight distribution (Mw/Mn)=1.73.

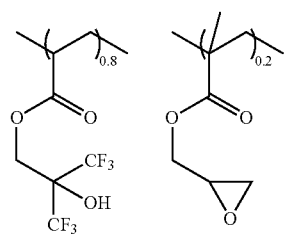

Low refractive
index polymer-1

Acid generator: AG1 (see the following structural formula)

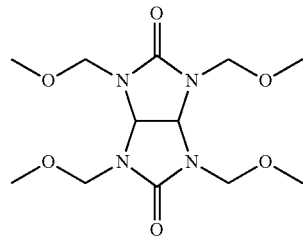

Crosslinking agent: CR1 (see the following structural formula)

CR1

Organic Solvents:
propylene glycol monomethyl ether acetate (PGMEA)
cyclohexanone (CyH)

High refractive index polymer, Low refractive index polymer, the crosslinking agent, the thermal-acid generator, and the solvents were blended in the composition of Table 1, spin coated onto a silicon wafer, and crosslinked by baking at 200° C. for 60 seconds to form a film with a film thickness of 200 nm (UDL-1, UDL-2, UDL-3, UDL-2-1, and UDL-2-2). Each refractive index of UDL-1, UDL-2, UDL-3, and UDL-2-1 was measured by spectroscopic ellipsometry. The results are shown in Table 1.

TABLE 1

| No. | Polymer (parts by mass) | Crosslinking agent (parts by mass) | Acid generator (parts by mass) | Solvent (parts by mass) | refractive index at wavelength of 600 nm | |
|---|---|---|---|---|---|---|
| | | | | | n value | k value |
| UDL-1 | High refractive index polymer-1 (15.0) | CR1 (2.0) | AG1 (0.5) | PGMEA (100) CyH (100) | 1.69 | 0.0 |
| UDL-2 | High refractive index polymer-2 (15.0) | CR1 (2.0) | AG1 (0.5) | PGMEA (100) CyH (100) | 1.63 | 0.0 |
| UDL-3 | High refractive index polymer-3 (15.0) | CR1 (2.0) | AG1 (0.5) | PGMEA (100) CyH (100) | 1.62 | 0.0 |
| UDL-2-1 | Low refractive index polymer-1 (15.0) | — | AG1 (0.5) | PGMEA (200) | 1.42 | 0.0 |
| UDL-2-2 | Low refractive index polymer-1 (15.0) | — | AG1 (0.5) | PGMEA (500) | — | — |

The inventive antireflective lamination film was formed by a process of repeating forming a pattern of High refractive index polymer-1 and applying Low refractive index polymer-1 thereon to bury the same. As the material for burring, the composition with higher solvent rate was used since the film thickness of an overburden of the upper part of the resist pattern had to be thin.

Under the same spin coating method and baking conditions as described above, an UDL-1 film with the film thickness of 200 nm was formed on a silicon wafer on which a polyimide film with the film thickness of 10 m was formed. Under the same conditions, an UDL-1 film with the film thickness of 200 nm was formed thereon, silicon-containing material for hard mask (SHB-A940, manufactured by Shin-Etsu Chemical Co., Ltd.) was applied thereon and baked at 200° C. for 60 seconds to form a hard mask layer with the film thickness of 40 nm, and KrF resist (SEPR-772, manufactured by Shin-Etsu Chemical Co., Ltd.) was applied thereon and baked at 100° C. for 60 seconds to form a resist layer with the film thickness of 200 nm. In this resist layer, holes with the size of 150 nm were formed in the layout shown in FIG. 9 with the pitch of 800 nm using a KrF excimer laser scanner S-206D (NA 0.82, annular illumination, manufactured by Nikon Corporation) and a 6% halftone phase shift mask. The resist pattern was transferred to the silicon-containing hard mask film by dry etching using Freon gas, and the silicon-containing hard mask pattern was transferred to the upper UDL-1 film using oxygen gas, followed by removing the silicon-containing hard mask pattern by dry etching with Freon gas to obtain a pattern having a cross section shown in FIG. 2. UDL-2-2 for burring was applied thereon and baked to obtain a film having a cross section shown in FIG. 4.

In the same manner as described above, UDL-1, silicon-containing hard mask material (SHB-A940), and KrF resist (SEPR-772) were formed thereon. In this resist layer, holes with the size of 150 nm were formed in the layout shown in FIG. 5 with the pitch of 550 nm using a KrF excimer laser scanner S-206D (NA 0.82, annular illumination, manufactured by Nikon Corporation) and a 6% halftone phase shift mask. The resist pattern was transferred to the silicon-containing hard mask film, and the silicon-containing hard mask pattern was transferred to the UDL-1 film, followed by removing the silicon-containing hard mask pattern by dry etching with Freon gas, and then, UDL-2-2 was applied and baked to obtain a pattern having a cross section shown in FIG. 5.

In the same manner as described above, UDL-1, silicon-containing hard mask material (SHB-A940), and KrF resist (SEPR-772) were formed thereon. In this resist layer, holes with the size of 150 nm were formed in the layout shown in FIG. 6 with the pitch of 300 nm using a KrF excimer laser scanner S-206D (NA 0.82, annular illumination, manufactured by Nikon Corporation) and a 6% halftone phase shift mask. The resist pattern was transferred to the silicon-containing hard mask film, and the silicon-containing hard mask pattern was transferred to the UDL-1 film, followed by removing the silicon-containing hard mask pattern by dry etching with Freon gas, and then, UDL-2-2 was applied and baked to obtain a pattern having a cross section shown in FIG. 6.

In the same manner as described above, UDL-1, silicon-containing hard mask material (SHB-A940), and KrF resist (SEPR-772) were formed thereon. In this resist layer, dots with the size of 150 nm were formed in the layout shown in FIG. 7 with the pitch of 550 nm using a KrF excimer laser scanner S-206D (NA 0.82, annular illumination, manufactured by Nikon Corporation) and a 6% halftone phase shift mask. The resist pattern was transferred to the silicon-containing hard mask film, and the silicon-containing hard mask pattern was transferred to the UDL-1 film, followed by removing the silicon-containing hard mask pattern by dry etching with Freon gas, and then, UDL-2-2 was applied and baked to obtain a pattern having a cross section shown in FIG. 7.

In the same manner as described above, UDL-1, silicon-containing hard mask material (SHB-A940), and KrF resist (SEPR-772) were formed thereon. In this resist layer, dots with the size of 150 nm were formed in the layout shown in FIG. 8 with the pitch of 800 nm using a KrF excimer laser scanner S-206D (NA 0.82, annular illumination, manufactured by Nikon Corporation) and a 6% halftone phase shift mask. The resist pattern was transferred to the silicon-containing hard mask film, and the silicon-containing hard mask pattern was transferred to the UDL-1 film, followed by removing the silicon-containing hard mask pattern by dry etching with Freon gas, and then, UDL-2-2 was applied and baked to obtain a pattern having a cross section shown in FIG. 8.

In the same manner as described above, UDL-2-1 was applied thereon and baked to obtain a film having a cross section shown in FIG. 1. This was used as an lamination film of Example 1.

In the same manner as described above except for forming only three layers of the first layer, the fourth layer, and the seventh layer shown in FIG. 1 to obtain a lamination film. This was used as the lamination film of Example 2.

As Comparative Example 1, an UDL-1 film with the film thickness of 200 nm was formed on a silicon wafer on which a polyimide film with the film thickness of 10 m was formed under the same spin coating method and baking conditions as described above, and an UDL-2-1 film with the film thickness of 200 nm was formed thereon.

As Comparative Example 2, only an UDL-1 film with the film thickness of 200 nm was formed on a silicon wafer on which a polyimide film with the film thickness of 10 m was formed under the same spin coating method and baking conditions as described above.

As Comparative Example 3, only an UDL-2-1 film with the film thickness of 200 nm was formed on a silicon wafer on which a polyimide film with the film thickness of 10 m was formed under the same spin coating method and baking conditions as described above.

As Comparative Example 4, no film was formed on a silicon wafer on which a polyimide film with the film thickness of 10 m was formed.

In the same manner as described above, each of the patterned films of the second layer to the sixth layer shown in FIG. 1 was produced solely on a silicon wafer; and each refractive index was measured. The results are shown in Table 2.

TABLE 2

| | Refractive index at wavelength of 600 nm | |
|---|---|---|
| | n value | k value |
| Second layer | 1.64 | 0.0 |
| Third layer | 1.60 | 0.0 |
| Fourth layer | 1.56 | 0.0 |
| Fifth layer | 1.51 | 0.0 |
| Sixth layer | 1.47 | 0.0 |

Figure 12:
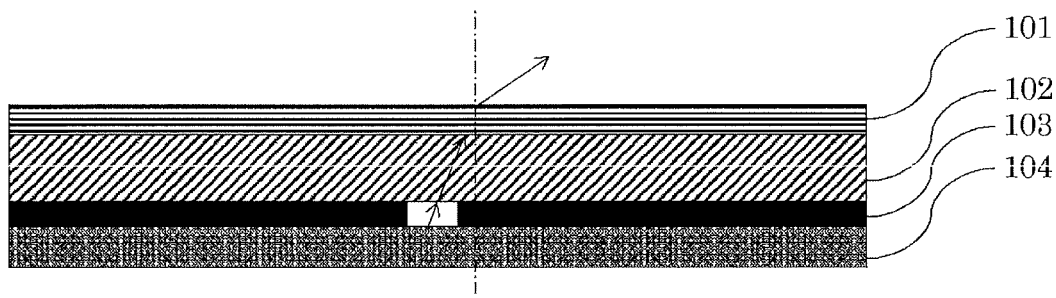
FIG. 12 is a schematic sectional view showing a method of measuring light transmittance of the inventive antireflective lamination film in Examples.

As shown in FIG. 12, the antireflective lamination film 101 on which a polyimide film was formed was peeled from the silicon wafer and stuck on the synthesis quartz substrate 102. On the antireflective lamination film 101, the illumination intensity at the angle of 60° thereof was measured by the method in which a slit with the width of 1 mm was formed in the shielding film 103 on the surface of the synthesis quartz substrate 102 at the side on which the antireflective lamination film 101 was not formed, and this slit was used as a point light source, which was illuminated with the LED illumination 104 of 1200 lumen white light in a fluorescent type attached thereto. In Comparative Examples 1 to 4, the same measurement was conducted. The results are shown in Table 3.

TABLE 3

|  | Candela (cd/m$^2$) |
| --- | --- |
| Example 1 | 14 |
| Example 2 | 10 |
| Comparative Example 1 | 7 |
| Comparative Example 2 | 5 |
| Comparative Example 3 | 4 |
| Comparative Example 4 | 1.5 |

As shown in Table 3, each inventive antireflective lamination film formed in Examples 1 and 2 showed higher illumination of the transmitted light. On the other hand, Comparative Examples 1 to 4 showed lower illumination of the transmitted light than that of the inventive antireflective lamination film.

From the foregoing, it was revealed that the inventive antireflective lamination film can give antireflection effect to bring lower reflection of light.

It is to be noted that the present invention is not restricted to the foregoing embodiment. The embodiment is just an exemplification, and any examples that have substantially the same feature and demonstrate the same functions and effects as those in the technical concept described in claims of the present invention are included in the technical scope of the present invention.

What is claimed is:

1. A transparent antireflective lamination film, comprising:
   a first film composed of a first material having a first refractive index;
   a second film having a refractive index lower than that of the first film laminated on the first film, the second film including a pattern composed of a second material having a second refractive index lower than the first refractive index formed in a film composed of the first material; and
   at least one layer of film laminated on the second film, the at least one layer of film including at least one of (i) a film including the pattern composed of the second material having larger area than in the second film, and (ii) a film including a pattern composed of a material having a refractive index lower than the second refractive index, the refractive index of each film is-successively decreasing toward an upper side from the first film in the antireflective lamination film,
   wherein a transmittance of visible light having a wavelength of 400 nm to 800 nm is 80% or more.

2. The antireflective lamination film according to claim 1, wherein at least one of (i) the pattern composed of the second material having the second refractive index lower than the first refractive index, and (ii) the pattern composed of the material having the refractive index lower than the second refractive index has a pattern size of 200 nm or less.

3. The antireflective lamination film according to claim 1, wherein the refractive index of the first film is 1.65 or more, and the refractive index of the film that has the lowest refractive index is 1.35 or less with respect to visible light having a wavelength of 590 to 610 nm.

4. The antireflective lamination film according to claim 2, wherein the refractive index of the first film is 1.65 or more, and the refractive index of the film that has the lowest refractive index is 1.35 or less with respect to visible light having a wavelength of 590 to 610 nm.

5. The antireflective lamination film according to claim 1, wherein at least one of the first material and the second material is a photoresist material.

6. The antireflective lamination film according to claim 2, wherein at least one of the first material and the second material is a photoresist material.

7. The antireflective lamination film according to claim 1, wherein at least one of the first material and the second material is a non-photosensitive material.

8. The antireflective lamination film according to claim 2, wherein at least one of the first material and the second material is a non-photosensitive material.

9. A method of forming the antireflective lamination film according to claim 1, wherein at least one of (i) the pattern composed of the second material having the second refractive index lower than the first refractive index, and (ii) the pattern composed of the material having the refractive index lower than the second refractive index is formed by photolithography.

10. A method of forming the antireflective lamination film according to claim 2, wherein the at least one of (i) the pattern composed of the second material having the second refractive index lower than the first refractive index, and (ii) the pattern composed of the material having the refractive index lower than the second refractive index is formed by photolithography.

11. The method of forming an antireflective lamination film according to claim 9, wherein the at least one of (i) the pattern composed of the second material having the second refractive index lower than the first refractive index, and (ii) the pattern composed of the material having the refractive index lower than the second refractive index is formed by photolithography and etching.

12. The method of forming an antireflective lamination film according to claim 10, wherein the at least one of (i) the pattern composed of the second material having the second refractive index lower than the first refractive index, and (ii) the pattern composed of the material having the refractive index lower than the second refractive index is formed by photolithography and etching.

13. A method of forming the antireflective lamination film according to claim 1, wherein the at least one of (i) the pattern composed of the second material having the second refractive index lower than the first refractive index, and (ii) the pattern composed of the material having the refractive index lower than the second refractive index is formed by an imprint method.

14. A method of forming the antireflective lamination film according to claim 2, wherein the at least one of (i) the pattern composed of the second material having the second refractive index lower than the first refractive index, and (ii)

the pattern composed of the material having the refractive index lower than the second refractive index is formed by an imprint method.

15. An eyeglass type display, comprising:
- a self-emitting display selected from the group consisting of liquid crystal, organic EL, and micro LED installed on a substrate at a side of an eyeball of the eyeglass type display, and
- a convex lens for focusing installed on the side of the eyeball of the self-emitting display,
- wherein the antireflective lamination film according to claim 1 is formed on a surface of the convex lens.

16. An eyeglass type display, comprising:
- a self-emitting display selected from the group consisting of liquid crystal, organic EL, and micro LED installed on a substrate at a side of an eyeball of the eyeglass type display, and
- a convex lens for focusing installed on the side of the eyeball of the self-emitting display,
- wherein the antireflective lamination film according to claim 2 is formed on a surface of the convex lens.

\* \* \* \* \*